United States Patent [19]

Boeckmann

[11] Patent Number: 4,869,048

[45] Date of Patent: Sep. 26, 1989

[54] STRETCHER FOR PACKAGE FORMING

[75] Inventor: Hugo Boeckmann, Arlington Heights, Ill.

[73] Assignee: Zip-Pak Incorporated, Northbrook, Ill.

[21] Appl. No.: 228,731

[22] Filed: Aug. 5, 1988

Related U.S. Application Data

[63] Continuation-in-part of Ser. No. 67,480, Jun. 29, 1987, Pat. No. 4,790,126.

[51] Int. Cl.$^4$ .......................... B65B 9/20; B65B 61/00
[52] U.S. Cl. ........................................ 53/451; 53/481;
53/551; 493/206
[58] Field of Search .................. 53/451, 450, 416, 552,
53/551, 550, 554, 555, 553, 481, 477, 371, 373;
493/194, 193, 207, 206, 209, 203

[56] References Cited

U.S. PATENT DOCUMENTS

| | | | |
|---|---|---|---|
| 2,732,988 | 1/1956 | Feinstein | 226/51 |
| 2,751,732 | 6/1956 | Woppman | 53/554 |
| 3,826,061 | 7/1974 | Hunter | 53/182 |
| 3,849,965 | 11/1974 | Dominici | 53/451 |
| 4,077,308 | 3/1978 | Scully | 93/19 |
| 4,090,344 | 5/1978 | Kelly | 53/28 |
| 4,534,159 | 8/1985 | Kelly | 53/451 X |

Primary Examiner—James F. Coan
Attorney, Agent, or Firm—Hill, Van Santen, Steadman & Simpson

[57] ABSTRACT

A method and apparatus for forming bags such as in a form, fill and seal machine wherein the bags are formed by drawing film downwardly over a filling tube and cross-sealing the bag tube and applying a lateral stretching force to the bag tube at the location of cross-sealing preventing wrinkles at the location of the seam formed by the cross-sealing with the stretching force applied at the extreme lateral edge of the film preferably by opposed cam surfaces at each of the bag edge which contact each other at a point just outside of the bag edges and progressively walk into the edge of the bag with the point of contact shifting in an outward direction while it progresses inwardly on the bag to apply a stretching force to the film of the bag for smoothing the entire width.

25 Claims, 4 Drawing Sheets

STRETCHER FOR PACKAGE FORMING

PRIOR APPLICATIONS

The present application is a continuation-in-part of application Ser. No. 067,480, entitled "Fill and Seal Machine for Reclosable Bags", Filed June 29, 1987 now U.S. Pat. No. 4,790,126.

BACKGROUND OF THE INVENTION

The present invention relates to improvements in methods and mechanisms for forming bags from plastic film or plastic film laminates, and more particularly to improved forming of bags in a form, fill and seal process.

In a form, fill and seal machine, a continuous layer of plastic or plastic laminate is drawn down over a filler tube and shaped into a bag tube with the edges of the film brought together and joined to make the bag tube. In one form as the edges of the bag are brought together, they are joined by a reclosable continuous zipper so that the edges form the eventual bag top. The bag tube is flattened beneath the filler tube and cross-sealed at intermediate spaced locations to form the side seams of the bag. When a cross-seal is made, the bag is filled with its contents through the filler tube. Another cross-seal is then made above the contents and the completed filled bag is cut from the bag tube.

In the formation of bags, it is important that a cross seal be made which is effective and tight, and particularly in the case where foodstuffs or liquid is filled into the bag, the cross-seal must be leak-proof and inasmuch as the bag tube must be pressed flat before sealing, the presence of wrinkles frequently prevents the completion of a strong seal and will result in leaks being present. The presence of wrinkles will also tend to detract from the appearance of the bag and is undesirable.

FEATURES OF THE INVENTION

In accordance with the principles of the invention, it is an object to provide an improved method and apparatus operating in a form, fill and seal operation in the manufacture of bags which is capable of forming cross-seals that are air and liquid-tight. A further object of the invention is to provide an arrangement for cross-sealing tubular bag stock wherein the cross-seals are smooth and do not have openings so as to cause leaks.

A further object of the invention is to provide an improved apparatus and method for flattening and stretching bag tubes in order to form a cross-seal wherein all portions of the tube are flattened and wrinkle-free and particularly to the extreme edges of the flattened bag tube.

A further object of the invention is to provide an improved mechanism for flattening a bag tube in order to form an effective leak-proof cross-seal wherein the flattening occurs without inducing any wrinkles in lightweight film and wherein wrinkles which may be present are completely eliminated for the full width of the bag tube completely to the folded edge.

In accordance with the invention as a bag tube is formed by pulling down a continuous sheet of film over a filler tube, the tube is flattened beneath the filler tube and a cross-seal formed. The cross-seal is formed by the application of a heat bar across the thermoplastic film, but at the time of the application of the heat bar, the film is stretched tightly across its width with the elimination of any wrinkles in either layer of the flattened tube. The elimination of wrinkles completely to the edge of the tube is also critical and essential. This is accomplished by beginning the application of a lateral pulling force at the extreme edge of the tube so that no wrinkles occur at the edge. In devices heretofore available, lateral pulling forces were applied, but these were applied at the general area of the edge of the bag by clamping the edges between a pair of pads or clamps and such clamps often themselves induced wrinkles in the material. Lateral pulling was accomplished by the pads being applied over a gripping area and lateral pulling was uniformly applied to both sides of the flattened film. This frequently resulted in wrinkles remaining in the film in at least one layer and wrinkles remaining at the film edges. Such wrinkles caused the film to be improperly sealed at the location of the wrinkles and caused leaks in the sides edges of the seam which was formed in the bag.

In the present arrangement, curved cam stretching members are applied to both surfaces of the bag at the very edges. These cam stretching members meet in point contact just outside the edges of the bag and walk inwardly across the bag material. While they are moving and walking inwardly across the bag material, they are also simultaneously moving outwardly with the pairs at each of the edges moving away from each other to apply a stretching force to the bag positively eliminating wrinkles in the lightweight thin film so that when the stretching is completed, the sealing bars can be applied to form a uniform seal completely across the bag tube which seal has no pockets or wrinkles to permit air or liquid leakage.

Other objects, advantages and features will become more apparent with the teaching of the principles of the invention in connection with the disclosure of the preferred embodiments thereof in the specification, claims and drawings, in which:

DESCRIPTION OF THE PREFERRED EMBODIMENT

Figure 1:
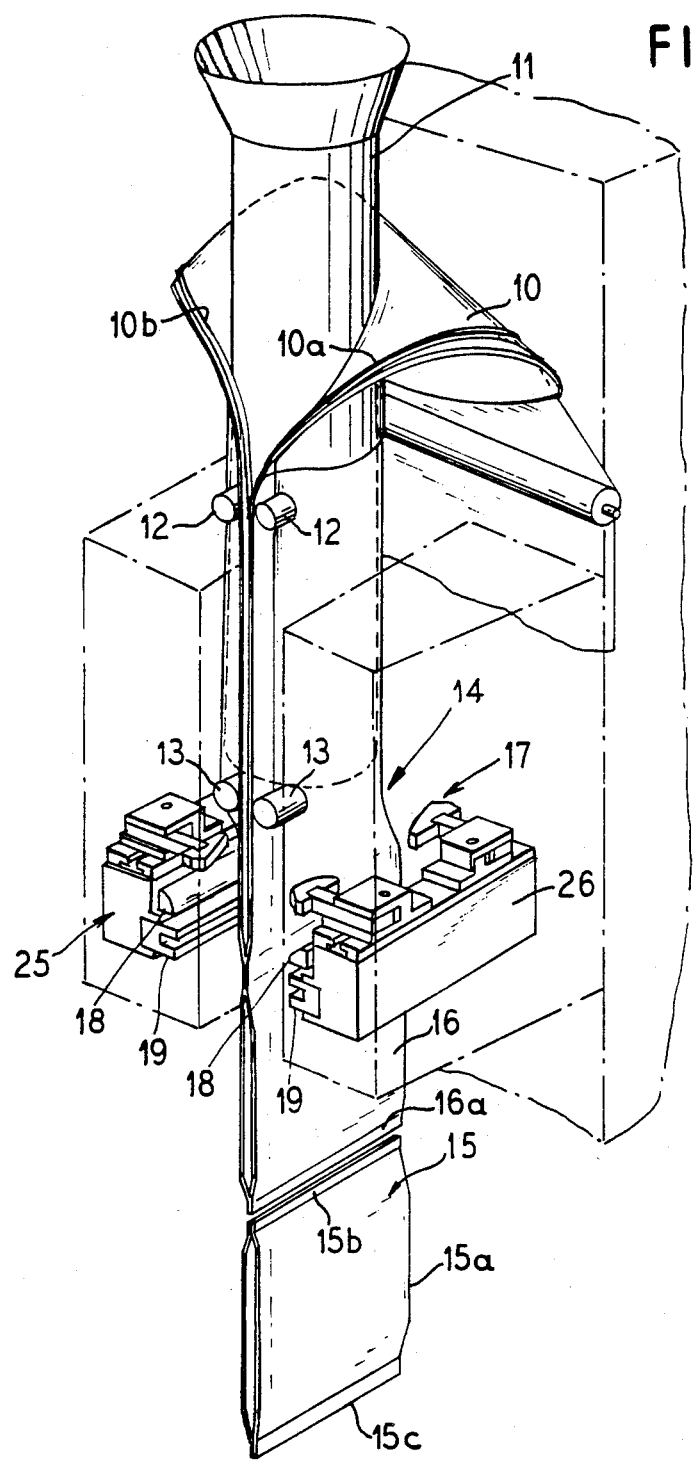
FIG. 1 is a somewhat perspective view of a form, fill and seal machine employing the concepts of the method and apparatus of the present invention in making cross-seals on the bag tube.

FIG. 1 illustrates a form, fill and seal machine wherein a continuous sheet of bag making plastic film 10 is fed and shaped over a filling tube 11. The material 10 may be plastic film or plastic laminate and the edges of the film are brought together to join interlocking profile fasteners 10a and 10b which are on the surface of the film 10. In a preferred arrangement, the film has been formed with the interlocking profile fasteners such as the rib and groove type, and these fasteners are aligned and pressed together to be interlocked between suitable equipment such as opposed rollers 12 and 13. In another form, the film may not carry integral interlocking profiles, but a profile strip may be fed downwardly between the edges of the film attached thereto. The edges of the film which carry the profiles will form the top of a finished bag which will then be a reopenable bag with pull flanges extending above the fastener profiles. The base 15a of the bag will be formed by the doubled film which is flattened after it passes the lower end of the filling tube 11. The sides of the bag will be formed by cross-seals 15b and 15c as shown for the completed bag in FIG. 1. The cross-seals which form the side seams of the bag are formed by an assembly shown generally at 14 which will be described below in further detail. The bag tube is shown at 16 with a cross-seal 16a formed at the lower end and a completed bag 15 severed and separated therefrom. With the cross-seal formed at the base of the tube, contents are fed into the bag tube through the filling tube 11. A subsequent cross-seal is formed above the contents and a finished bag is severed from the bag tube. The cross-seal is formed to form a seal at the side of the bag tube and at the top of the filled bag and a cut is formed between the seals 15b and 16a to drop off a completed bag.

An important feature of the present invention is the stretching of the flattened bag tube in a way that all wrinkles are removed from the plastic film so that the cross-seal can be made without any wrinkles thereby preventing the formation of any leaks and presenting a more attractive bag. In efforts heretofore made to flatten the bag tube and stretch it, flattening forces were applied by clamping the tube and pulling it laterally, but the layers of the film were not pulled in such a way to remove the wrinkles from both layers of films, and wrinkles were not removed at the sides of the bag so wrinkles were left beneath the clamping pads.

In accordance with the present invention, the equipment shown at 14 in FIG. 1 includes a lateral stretching mechanism which stretches to the very edges of the bag. The stretching mechanism can be positioned directly adjacent the sealing bars such as above the bars or a stretching mechanism can be utilized both above and below the bars. The stretching mechanism is such that it applies a stretching force at the very distal edges of the flattened bag and the stretching force is gently applied to both layers of the film continuing to stretch the film until it is completely flat just prior to the application of the sealing bars. The sealing bars are heated so that as they are pressed against the outer surface of the film, the thermoplastic film is joined to form the cross-seam.

Figure 2:
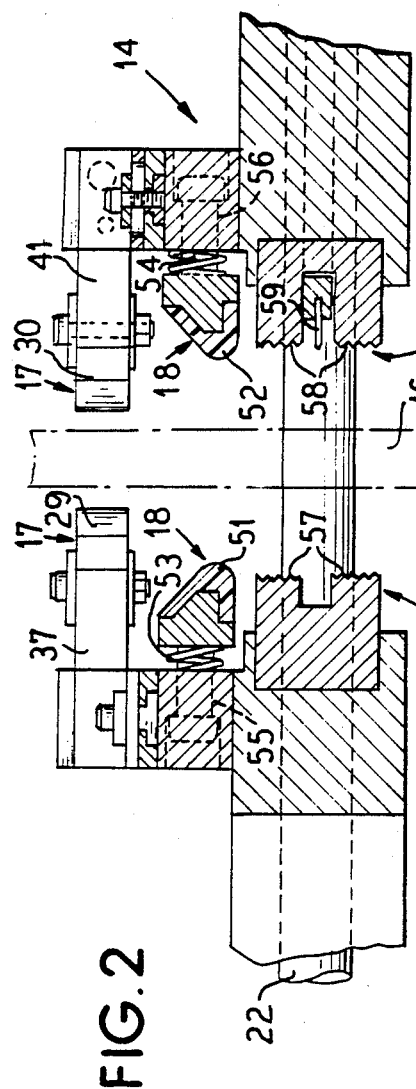
FIG. 2 is a fragmentary sectional view showing the mechanism embodying the invention at the location where the cross-seal is formed with the sectional view taken essentially along line II—II of FIG. 4.
Figure 3:
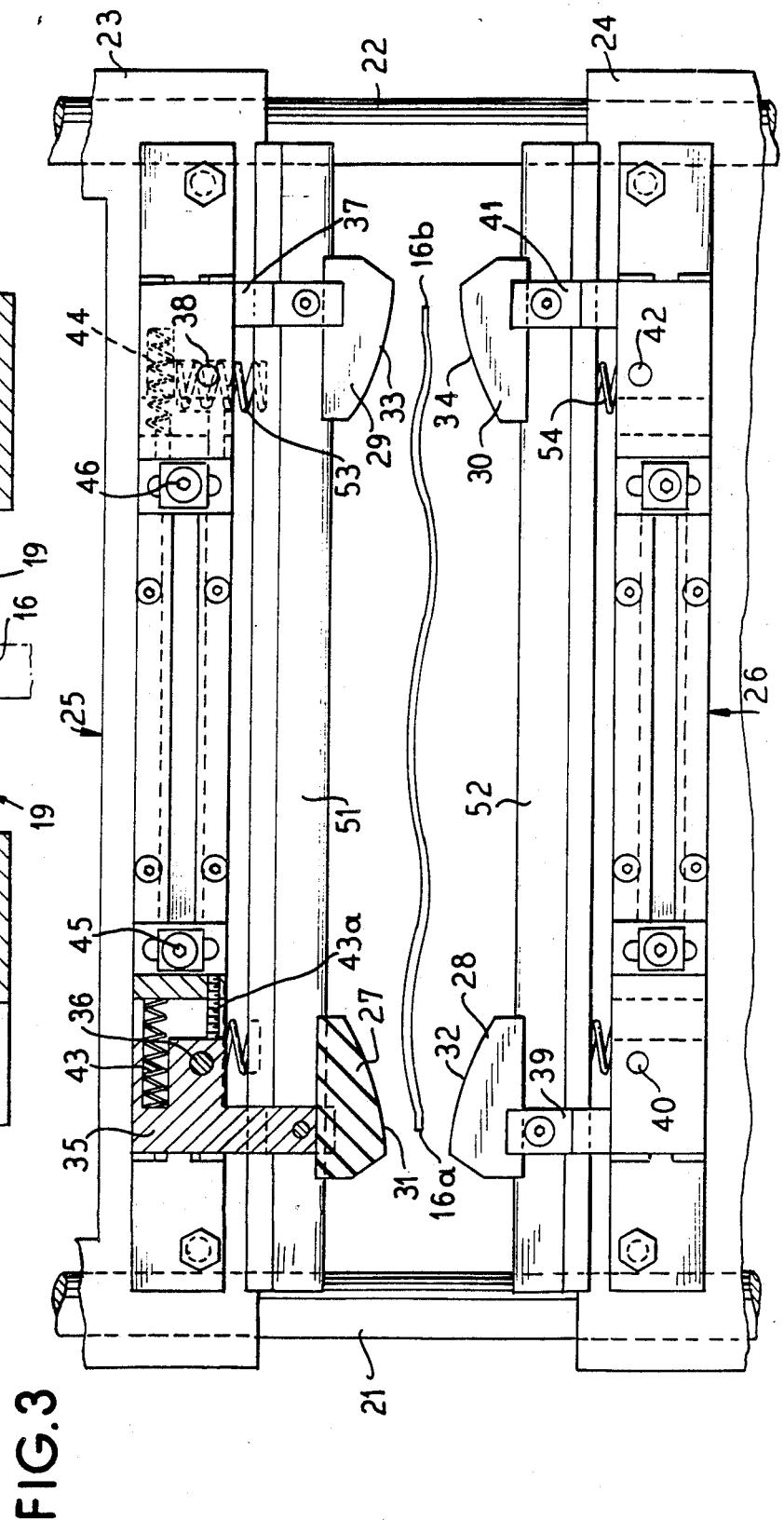
FIG. 3 is a top plan view with portions in section of the mechanism of FIG. 2 illustrating the parts prior to the application of the stretching force to the bag tube.
Figure 4:
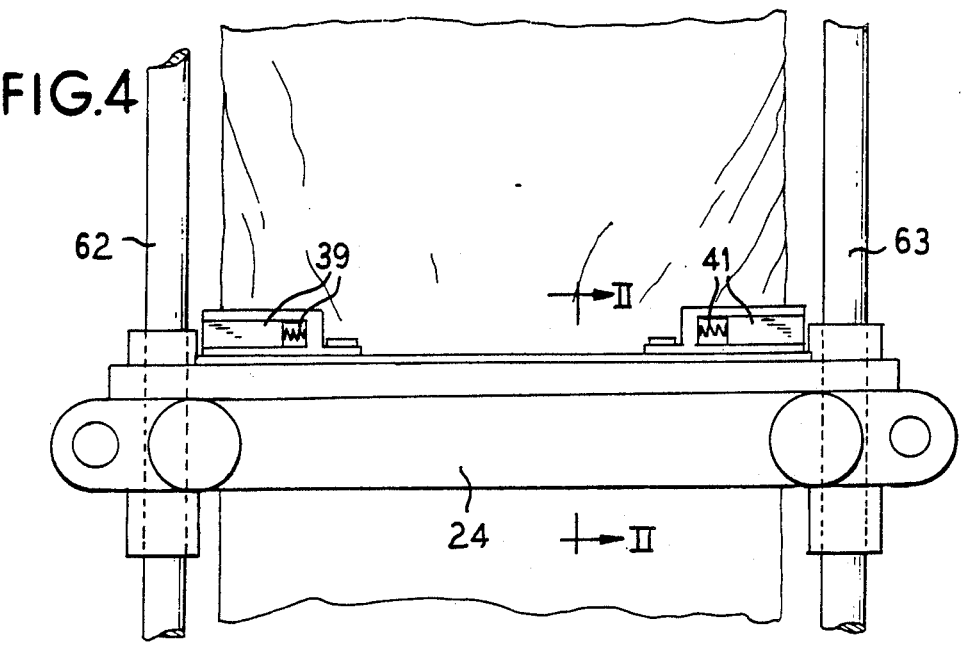
FIG. 4 is an elevational view at the location where the cross-seam is formed.

Shown better in FIGS. 2 through 4, the mechanism located at 14 includes the stretching equipment 17, holding bars 18 and sealing and cutting mechanism at 19. The three pieces of equipment for stretching, clamping and sealing and cutting are carried on laterally movable carriages 23 and 24 shown overall at 25 and 26, which slide on horizontal guide bars 21 and 22. The carriages are pushed inwardly to effect the operations on the bag tube 16 by operating mechanism not shown. Such operating mechanism may be in the form of a hydraulic or pneumatically operated cylinder which pushes the carriages together and again separates them after the bag tube has been laterally stretched, clamped, and cross-sealed and cut.

The stretching equipment includes opposed cam pads 27 and 28 at one edge of the bag tube 16 and opposed cam pads 29 and 30 at the other edge.

To begin the formation of the cross-seams, the carriages 23 and 24 are pushed toward each other and the stretching cam pads 27 and 28 first contact each other in point contact just outside of the lateral edge of the bag tube 16. Simultaneously, the cam pads 29 and 30 contact each other at point contact just outside the outer edge of the bag tube 16 and this point contact is shown in detail in FIG. 5.

Figure 6:
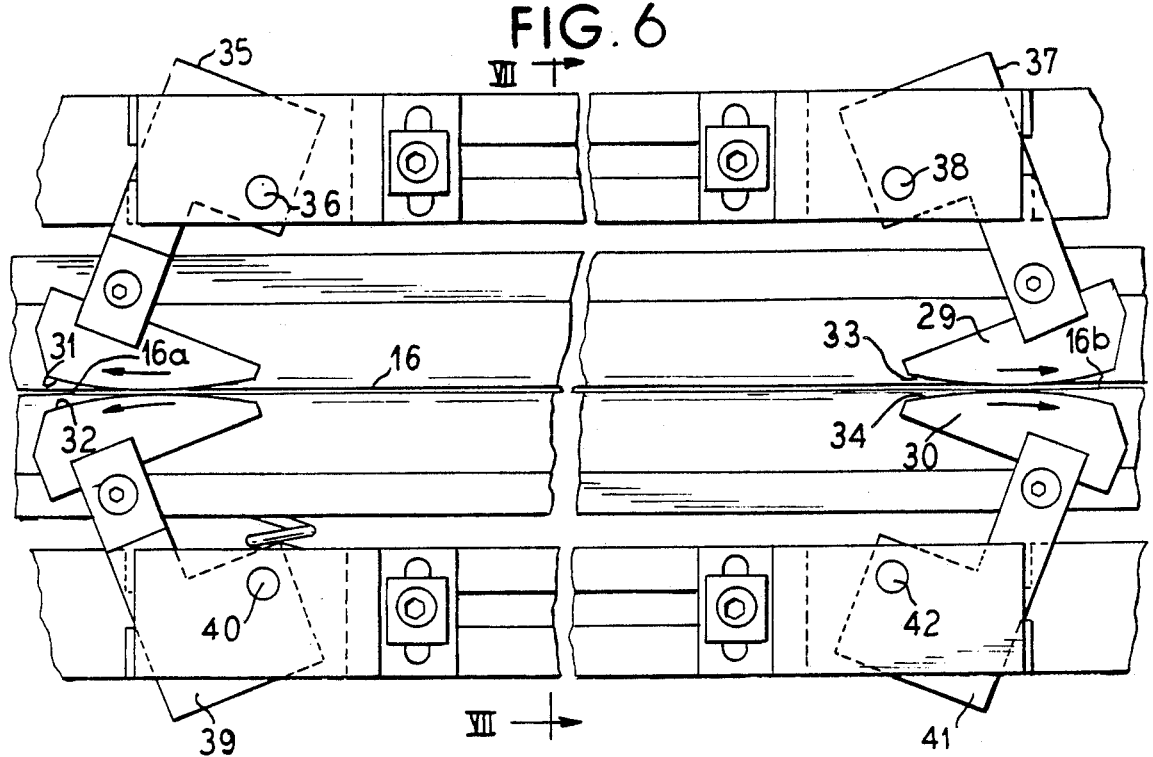
FIG. 6 is a top plan view, similar to FIGS. 3 and 5 but with portions omitted illustrating the position of the parts as the stretching force progresses and the layers of film are stretched just prior to making the cross-seal.

The cam pads are mounted on pivotal support arms with the pivot point of said support arms being laterally offset from the surfaces of the cam pads such that when the cam pads are pressed against each other, their point contact rolls inwardly to roll over the edges of the bag tube 16 and simultaneously begin pulling outwardly to pull the bag tube flat and remove all wrinkles. This progressive rolling over the edges of the bag tube and simultaneously moving outward is illustrated in FIG. 6. Also, the point contact pressure will be applied at substantially uniform force as it moves inwardly.

As to the construction of the support for the cam pads, pads 27 and 28 are supported on pivotal arms 35 and 39. The cam pads 29 and 30 are supported on pivotal arms 37 and 41.

The arms 35 and 39 are pivotally supported at 36 and 40.

Figure 5:
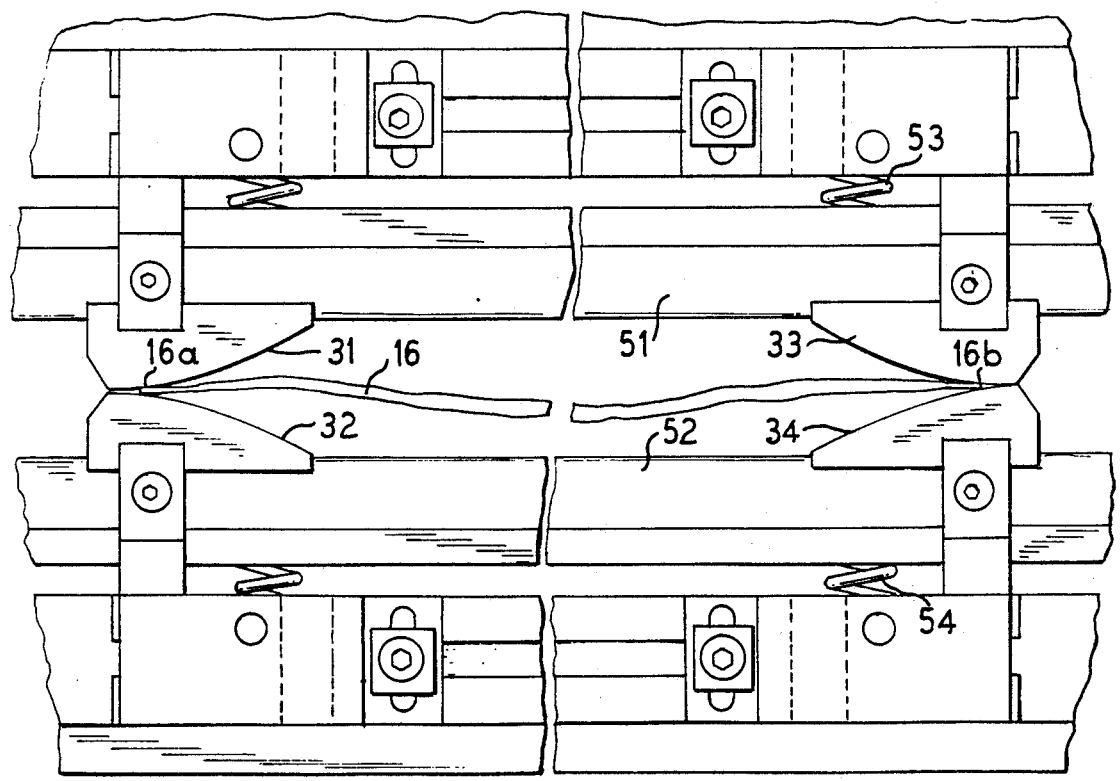
FIG. 5 is a plan view, similar to FIG. 3, but illustrating the location of the parts just prior to the beginning of the application of the stretching force.

The cam pad supporting arms 37 and 41 are pivotally supported respectively at 38 and 42. As will be observed, these pivotal support points are lateral of the point of first contact of the cam pads which is shown in FIG. 5. Thus, the reactant forces between the cam pads will cause the arms to pivot laterally outwardly as indicated by the curved arrowed lines in FIG. 6.

The cam pads are formed of a rubber material so that their outer surfaces will frictionally grip the film of the bag tube to pull it laterally. The faces are also logarithmically shaped so that as the point of contact between opposing pads shifts, it rolls inwardly over the bag tube to get a better grip and simultaneously travels laterally outwardly to apply a stretching force to the bag tube. The logarithmic contact surfaces for pads 27 and 28 are shown at 31 and 32. Logarithmic contact surfaces for the pads 29 and 30 are shown at 33 and 34.

Figure 7:
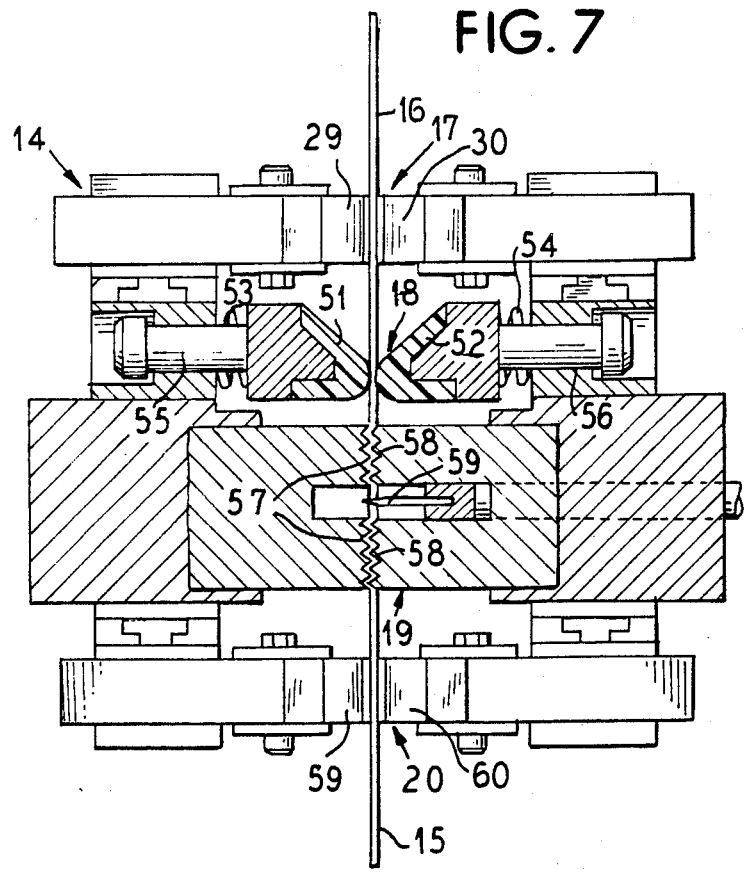
FIG. 7 is a fragmentary sectional view taken substantially along VII—VII of FIG. 6.

After the cam pads have contacted as shown in FIG. 5, and after they have rolled inwardly applying their stretching force, first beginning at the very outer edges 16a and 16b of the tube, the tube is clamped by clamping bars 51 and 52, FIG. 7, and the bag tube is then heat sealed by the sealing bar surfaces 57 and 58. At the same time, a knife 59, FIG. 7, in the recess of the bars, cuts the lower bag 15 from the bag tube.

When this has been completed, the carriages 22 and 24 are withdrawn from the bag tube, and the arms holding the stretch cams are spring loaded so that the stretch cams are pivoted back to the position shown in FIG. 3. As shown in FIG. 3, arm 35 is biased by a coil compression spring 43 which tends to urge it to the neutral non-stretch position shown in FIG. 3. An adjustable stop 43a limits the return pivotal movement of the cam arm 35. Similar springs are provided for the other cam arms with spring 44 serving the cam arm 37.

The lateral position of the cams is also adjustable by mechanism not shown in detail. The position of the stretch cams toward each other is adjustable such as by bolts 45 and 46, FIG. 3.

Turning again to the relative position of the parts after the bag tube 16 has been stretched as was begun by the parts in FIG. 5 and completed in FIG. 6, the clamping bars 51 and 52 clamp the stretched bag tube. The clamping bars have soft noses so as to not damage the film and are mounted on plunger rods 55 and 56 as shown in FIG. 7. These rods are spring biased by springs such as 53 and 54 to urge the clamping bars 51 and 52 in a direction to clamp the bag tube material 16. With the material so clamped, as shown in FIG. 7, the sealing bar faces 57 and 58 engage the film and being heated, seal the film to form a cross-seal across the tube. The knife 59 severs the tube so that the bag 15 can be separated from the tube.

FIG. 7 illustrates an optional arrangement wherein stretch cams may be employed below the sealing bars at location 20, as well as above the sealing bars at location 17. Stretch cams 59 and 60 are shown and will be of similar construction to the pairs of stretch cams located above the sealing bars, and therefore need not be described further in detail. The upper and lower stretch cams are carried on the same carriage so they engage each other simultaneously and simultaneously roll onto the outermost edges 16a and 16b of the bag tube to begin stretching it at the very edge.

After the cross-seals have been formed, and the lower bag cut from the bag tube, the sealing bars are moved vertically downwardly on vertical guide rods 62 and 63, FIG. 4. This pulls the bag tube downwardly so that contents can be dropped into the bag tube. The carriages 23 and 24 are then pulled apart and the assembly moved upwardly to again move inwardly to clamp the tube after contents have been dropped into the bag tube.

In operation with the equipment as shown in FIG. 1, a continuous supply of film is fed forwardly and drawn down over the filling tube 11, and the interlocking profiles 10a and 10b are joined. As the film is pulled downwardly and a cross-seal 16a is completed, the bag is filled by the contents being dropped through the filler tube 11. The assembly 14 moves against the tube from two sides, flattening it and applying a lateral tension to the material starting at the very edge of the film drawing out all wrinkles and curvature as illustrated generally by the successive steps of FIGS. 3 and 5. The unique movement of the contact faces of the cams pulls the material taut so that all wrinkles disappear and the heated sealing bars 51 and 52, FIGS. 2 and 7, form a seam across the material. The previously filled bag is cut from the film above by the knife 59. The carriages 14 are then moved downwardly to pull down a fresh supply of film so that the next succeeding bag can be filled with contents dropped through the tube 11. This procedure of the carriages moving against the tube pulling it down sealing the bottom of the next succeeding tube and then moving upwardly to engage above contents is repeated at production manufacturing speed producing improved bags in a very reliable fashion.

When the contents are dropped into the closed end of the tube, the procedure is repeated in the steps as follows. The lateral carriages 23 and 24, FIG. 3, are moved inwardly against the bag tube and above the contents. The stretch cams 27 and 28 at one edge 16a of the bag tube and the stretch cams 29 and 30 at the other edge 16b of the tube first contact each other at point contact, FIG. 5, just outside the outer edge of the tube 16. With continued inward movement of the carriages 23 and 24 toward each other, the reactive forces between the cams cause them to roll against each other over the outer edges of the bag tube while simultaneously moving laterally outwardly away from each other. This applies a stretching force to the bag tube 16 removing all wrinkles therefrom and applies the force to each layer due to the frictional engagement between the outer surfaces of the stretch cams and the film of the bag tube. Continued movement of the carriages toward each other applies a stretching force to pull the bag tube laterally taut as illustrated in FIG. 6. At that point, the continued movement of the carriages toward each other will have brought the clamping bars 51 and 52 against the surfaces of the film, as shown in FIG. 7, and will have brought the sealing bars to a position such that their heated surfaces 57 and 58 engage the flattened bag tube to form the cross-seals. The knife 59 will have severed the lower bag 15 from the tube. The carriages then are moved vertically downwardly to pull the bag tube downwardly so that a fresh length of tube is pulled beneath the filler tube 11. The carriages then separate and move upwardly in a position ready to again clamp the tube and form a new cross-seal after contents have been dropped into the bag tube.

Thus, it will be seen that there has been provided an improved method and apparatus for the manufacture of bags by the form, fill and seal process. Improved bags are formed in that the leak-proof nature of the seals is assured. The apparatus employing the process is of a reliable nature which is capable of rapid operation and operation over a long period of time without repair of servicing thereby increasing the speed the production of bags and increasing the reliability of manufacture.

I claim as my invention:

1. In a form, fill and seal machine for making and filling bags from a continuous plastic film comprising in combination:

a vertical filler tube over which film is formed into a general cylindrically shaped bag tube for filling with contents through the filler tube;

means for advancing and shaping film in a downward direction over the filler tube to form a bag tube;

cross-sealing means located at a sealing station below the filler tube for forming seams across the bag tube at spaced intervals to make bags between the seams;

and a lateral smoothing stretcher means located generally at said sealing station applying a lateral stretching force at a point location to the tube with said point location moving inwardly from the tube edge preventing wrinkles at the location of said seam, said smoothing means applying stretching force at the extreme lateral edge of the film for smoothing the entire width of the film from the outer edges inwardly.

2. In a form, fill and seal machine for making and filling bags from a continuous plastic film in accordance with the structure of claim 1: wherein said stretcher means engages the bag tube at a point beginning at the extreme edge of the tube in contact applying a force at said point contact beginning at the extreme lateral edge of the bag tube and moving inwardly.

3. In a form, fill and seal machine for making and filling bags from a continuous plastic film in accordance with the structure of claim 1:

wherein said stretcher means engages the film in a progressively inwardly moving contact moving inwardly from the edge of the bag tube while applying the stretching force at uniform pressure while moving inwardly.

4. In a form, fill and seal machine for making and filling bags from a continuous plastic film in accordance with the structure of claim 1:
wherein said stretcher means includes opposed curved faces engaging the bag tube edge from opposite surfaces thereof.

5. In a form, fill and seal machine for making and filling bags from a continuous plastic film in accordance with the structure of claim 4:
wherein said curved faces engage the film with point contact with said point contact moving progressively inwardly.

6. In a form, fill and seal machine for making and filling bags from a continuous plastic film in accordance with the structure of claim 4:
wherein said faces are logarithmically shaped so that they move progressively inwardly from the edge of the film.

7. In a form, fill and seal machine for making and filling bags from a continuous plastic film in accordance with the structure of claim 1:
the lateral edges of the film applying a separating force thereto smoothing the film between said stretcher means.

8. In a form, fill and seal machine for making and filling bags from a continuous plastic film comprising in combination:
means for advancing and shaping a continuous supply of plastic film to form a downwardly descending bag tube;
means for spreading the tube at spaced cross-sealing stations including opposed pivotal cams at each edge of the bag tube with said cams having curved faces for engaging the surface of the tube;
and means for moving the pivotal cams toward each other at each edge of the bag to engage the extreme outer edges of the bag tube and pull the edges laterally to smooth the bag material therebetween.

9. In a form, fill and seal machine for making and filling bags from a continuous plastic film in accordance with the structure of claim 8:
wherein said cams are pivotally mounted at a point off-center from the point of engagement of the cam with the bag tube so that said cams pivot upon engagement with the bag film.

10. In a form, fill and seal machine for making and filling bags from a continuous plastic film in accordance with the structure of claim 8:
wherein the pivotal movement of said cams causes them to move progressively inwardly while applying a lateral stretching force.

11. In a form, fill and seal machine for making and filling bags from a continuous plastic film in accordance with the structure of claim 8:
including sealing bars positioned to engage the bag tube substantially immediately after the cams have stretched the bag material.

12. In a form, fill and seal machine for making and filling bags from a continuous plastic film in accordance with the structure of claim 11:
including cutting means for cross-severing the bag tube to separate a bag from the bag tube.

13. In a form, fill and seal machine for making and filling bags from a continuous plastic film in accordance with the structure of claim 11:
wherein the sealing bars are located above the cams and holding bars are provided for engaging the tubular film above the sealing bars and flattening the bag tube.

14. In a form, fill and seal machine for making and filling bags from a continuous plastic film in accordance with the structure of claim 8:
wherein the cams are shaped with a logarithmic face for progressively moving inwardly from the edge of the bag tube.

15. In a form, fill and seal machine for making and filling bags from a continuous plastic film in accordance with the structure of claim 8:
wherein said cams have a resilient soft face engaging the bag tube.

16. In a form, fill and seal machine for making and filling bags from a continuous plastic film in accordance with the structure of claim 8:
wherein the cams are shaped to engage the bag tube to lie in contact in inward movement from the tube edge.

17. The method of forming bags in a form, fill and seal process comprising the steps:
advancing film incrementally over a filling tube to shape a bag tube and deposit contents through the filling tube;
joining the vertical edges of the film to close the bag tube;
cross-sealing the bag tube beneath the filling tube at a sealing station top to form a cross-bag seam with the bag contents dropped into the tube above the seam;
and stretching the bag tube laterally prior to cross-sealing applying a lateral stretching force at the extreme edge of the bag tube and gradually applying the force at a point location moving inwardly from the edge to flatten and stretch the complete width of the tube preventing wrinkles therein at the seam.

18. The method of forming bags in a form, fill and seal process in accordance with the steps of claim 17:
including first flattening the bag tube at the sealing station and thereafter stretching the bag tube laterally.

19. The method of forming bags in a form, fill and seal process in accordance with the steps of claim 17:
including applying said lateral stretching force by engaging the bag tube at point contact at the extreme edge.

20. The method of forming bags in a form, fill and seal process in accordance with the steps of claim 17:
including applying the lateral stretching force at the extreme edge and moving progressively laterally inwardly from the edge while continuing to apply the stretching force at a point location at a substantially uniform force.

21. The method of forming bags in a form, fill and seal process in accordance with the steps of claim 19:
including moving said point contact progressively inwardly on the tube while concurrently moving the location of the point contact outwardly to continue to apply the stretching force.

22. The method of forming bags in a continuous process from a supply of plastic film formed into a tube comprising the cross-sealing the tube at spaced increments to form successive bags;

and stretching the bags at the general location of the cross-seal by applying a lateral force at the extreme edge of the bag and gradually applying the same amount of force moving inwardly preventing wrinkles throughout the entire width of the tube.

23. The method of forming bags in a continuous process from a supply of plastic film formed into a tube in accordance with the steps of claim 22:

including applying a rolling stretching force beginning at the extreme edges of the tube and progressively moving inwardly from the edge while continuing to stretch the tube laterally.

24. In a form/fill/seal packaging machine for making product-containing bags from a continuous length of sheet material having lengthwise directed male and female reclosable fastener strips, said machine having means for effecting intermittent advancement of said sheet material, means for sealing free edges of said bags, and means for interlocking said male and female fastener strips during formation of said bags, improvement comprising:

two pairs of pivotal arm means respectively disposed on a pair of carriers between which said sheet material passes, said carriers disposed for movement towards and away from each other, each arm means of each pair facing across said sheet material with one arm means of the other pair, and each said arm means being biased towards said sheet material, such that said facing arm means together engage said sheet material and actuate each other on contact with said sheet material to stretch said sheet material transversely in preparation for application of a transverse seal of bag free edges, said arm means having convex material engaging faces to have rolling contact with the material.

25. The improvement of claim 24:

wherein said carriers include heat sealing means for effecting said transverse seal.

* * * * *